US008826005B1

(12) United States Patent
Brichford

(10) Patent No.: US 8,826,005 B1
(45) Date of Patent: Sep. 2, 2014

(54) SECURITY FOR SOFTWARE IN A COMPUTING SYSTEM

(75) Inventor: Christopher Brichford, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1517 days.

(21) Appl. No.: 12/195,800

(22) Filed: Aug. 21, 2008

(51) Int. Cl.
   *H04L 29/06* (2006.01)
(52) U.S. Cl.
   USPC ............ 713/156; 713/176; 713/180; 726/2; 717/168; 717/174; 717/175; 717/178
(58) Field of Classification Search
   USPC ........ 713/156, 176, 180; 726/2; 717/168, 178
   See application file for complete search history.

(56) References Cited

U.S. PATENT DOCUMENTS

| 6,687,745 | B1 | 2/2004 | Franco et al. | |
| 7,594,108 | B2* | 9/2009 | Vaidyanathan | 713/157 |
| 7,788,707 | B1* | 8/2010 | Zhou | 726/4 |
| 2004/0049515 | A1* | 3/2004 | Haff et al. | 707/100 |
| 2006/0015562 | A1* | 1/2006 | Kilian-Kehr et al. | 709/206 |
| 2006/0048131 | A1* | 3/2006 | Napier et al. | 717/168 |
| 2006/0129817 | A1* | 6/2006 | Borneman et al. | 713/170 |
| 2006/0206890 | A1* | 9/2006 | Shenfield et al. | 717/174 |
| 2007/0088741 | A1 | 4/2007 | Brooks et al. | |
| 2007/0094508 | A1* | 4/2007 | Palum et al. | 713/176 |
| 2007/0180509 | A1* | 8/2007 | Swartz et al. | 726/9 |
| 2007/0261047 | A1* | 11/2007 | Sah et al. | 717/168 |
| 2008/0028390 | A1 | 1/2008 | Fors et al. | |
| 2008/0052705 | A1* | 2/2008 | Kaufman et al. | 717/174 |
| 2008/0159540 | A1* | 7/2008 | Maetz et al. | 380/277 |
| 2009/0031141 | A1* | 1/2009 | Pearson et al. | 713/187 |
| 2010/0005291 | A1 | 1/2010 | Hulten et al. | |

OTHER PUBLICATIONS

"Antispy Software—Protect Your Computer with Windows Defender" [online] (published Jan. 1, 2007). Microsoft Corporation 2008 [retrieved on Aug. 7, 2008]. Retrieved from the Internet: http://www.microsoft.com/protect/computer/basics/antispyware.mspx (3 pages).

"Apple's Ability to Deactive Malicious App Store Apps" [online] (published Aug. 6, 2008) 2000-2008 MacRumors.com, LLC [retrieved on Aug. 7, 2008]. Retrieved from the Internet: http://www.macrumors.com/2008/08/06/apples-ability-to-deactivate-malicious-app-store-apps/ (4 pages).

"Certificates and Certificate Authorities, Chapter 6—10.6—Fundamental Security Concepts", http://ccfit/nsu.ru/~ilya/grid/manuals/globus/tutorial/ch10s04.html, printed from Web on Dec. 2, 2007 (3 pages).

Housley et al., "Internet X.509 Public Key Infrastructure Certificate and Certificate Revocation List (CRL) Profile," RFC 3280, 127 pages (Apr. 2002).

(Continued)

*Primary Examiner* — Saleh Najjar
*Assistant Examiner* — Peiliang Pan
(74) *Attorney, Agent, or Firm* — Shook, Hardy & Bacon L.L.P.

(57) ABSTRACT

Systems, methods, and computer-program products enable a security system. Trust information is received, at a computer, where the trust information corresponds to an application and wherein the trust information comprising a digital signature from a trusted entity that is different than the developer of the application. A determination is made whether a user associated with the computer trusts the trusted entity. The digital signature is used to install the application on the computer if the user trusts the trusted entity.

35 Claims, 4 Drawing Sheets

(56) References Cited

OTHER PUBLICATIONS

"How to stop an Active X control from running in Internet Explorer" [online]. Microsoft Corporation 2008 [retrieved on Dec. 2, 2007]. Retrieved from the Internet: http://supoort.microsoft.com/kb/240797 (5 pages).

"Phishing Filter: Help protect yourself from online scams" [online] (published Oct. 28, 2006; updated Apr. 29, 2008). Microsoft Corporation 2008 [retrieved on Jul. 22, 2008]. Retrieved from the Internet: http://www.microsoft.com/protect/products/yourself/phishingfilter.mspx (4 pages).

Researcher discovers targeted iPhone app "kill switch" [online] (published Aug. 6, 2008). AppleInsider 1997-2008 [retrieved on Aug. 7, 2008]. Retrieved from the Internet: http://www.appleinsider.com/articles/08/08/06researcher_discovers_long_publicized_iphone_app_kill_switch.html (7pages).

U.S. Patent Office, U.S. Appl. No. 12/202,116, filed Aug. 29, 2008, in Office Action Mar. 14, 2011, 16 pages.

"Security Vulnerability Research & Defense: The Kill-Bit FAQ: Part 2 of 3" [online]. © 2008 Microsoft Corporation [retrieved on Jul. 122, 2008]. Retrieved from the Internet: http://blogs.technet.com/swi/archive/2008/02/07/The-Kill 2D00 Bit-FAQ 3A00-Post-2-of-3.aspx (4 pages).

"Antivirus & Content Security Software I Securing Your Web World—Trend Micro USA" [online]. Trend Micro™ [retrieved on Jul. 22, 2008]. Retrieved from the Internet: http:llus.trendmicro.com/us/home/ (5 pages).

"Technology Overview" [online]. © 1995-2008 Symantec Corporation [retrieved on Jul. 22, 2008]. Retrieved from the Internet: http://www.symantec.com/about/profile/technology.jsp (4 pages).

"The best antivirus and antispyware now with firewall" [online]. Webroot.com [retrieved on Jul. 22, 2008]. Retrieved from the Internet: http://www.webroot.com/En_US/consumer-products-antivirus.html (3 pages).

McAfee—Antivirus Software and Intrusion Prevention Solutions [online]. McAfee® [retrieved on Jul. 22, 2008]. Retrieved from the Internet: http://www.mcafee.com/us/ (2 pages).

"Tutorial Introduction Digital Certificates PKI Guide Encryption Signing Signature", Verisign, www.verisign.com.au/repository/tutorial/digital/lintro1.shtml, printed from Web on Dec. 2, 2007 (5 pages).

"Using Digital Certificates" [online]. © Microsoft Corporation 2008 [retrieved on Jul. 22, 2008]. Retrieved from the Internet: http://www.microsoft.com/technet/prodtechnol/windows2000serv/reskit/ierkCH06_c.mspx (7 pages).

CyberTechHelp Support Forums, Apr. 2, 2007, Cyber Tech Help.

Tactical Gamertechnical support & FAQs, Jul. 21, 2001, Tactical Gamer.

CNET Download.com, Free Software Downloads and Software Reviews, Apr. 5, 2008. Retrieved from the Internet: http://classic-web.archive.org/web/20080405035528/www.download.com/, 9 pages.

\* cited by examiner

SECURITY FOR SOFTWARE IN A COMPUTING SYSTEM

BACKGROUND

The present disclosure relates to security for software that runs in a computing system, such as security for software applications that run in a cross-platform runtime environment of a computing platform.

Many approaches to managing software that is run in computing systems have been developed, and in particular, various approaches have been taken to help prevent malicious software from being installed or run on a computer. The need to trust software is particularly important where software runs as a desktop application that has power over a computer. For instance, software running locally on a machine may have the power to perform actions such as changing the state of the machine, changing or accessing data, and deleting files. Among other concerns is whether such software will cause harm to a computer or compromise user data.

To identify software as trusted, WINDOWS® based computer platforms often enable the use of certificates. Certificates are electronic documents that incorporate a digital signature to bind together a public key with an identity. For instance, a public key certificate can be used to verify that a public key belongs to an individual. Typical certificates include self-signed certificates, which contain a public key and a signature of that public key by a private key that corresponds to the public key, and chained certificates, which depend on a third party entity to confirm the identity of an entity. Certificates can be checked at install time, and various notifications regarding the software application can be provided to the user, based on the certificate, at the time of installation, to help the user in determining whether or not to proceed with the installation. Additionally, any applications having a certificate that chains to a valid certificate can be considered legitimate.

When a software program (such as a plug-in to a Web browser) is downloaded from the Internet, the software program may be associated with a certificate. In such a case, the Web browser provides information from the digital certificate (e.g., the name of the of application and the identity of the entity that signed the application using the certificate) along with a notice regarding the risks of trusting the information and the program, in order to help the user in safe guarding their computer from potentially malicious programs. For example, if the digital certificate is a self-signed certificate, the Web browser will notify the user of the increased risk of installing such software, as opposed to software that has been signed by a certificate that is co-signed by a recognized certificate authority.

Other mechanisms for preventing the operation of harmful software on a computer include commercially available software products providing anti-spyware and anti-virus features designed to maintain computer security. These software products typically scan files (e.g., executable files) for know bit patterns to identify viruses, Trojan horses, worms, etc. The scanning is typically performed periodically for software and data stored on a computer, and for network communications at the time of sending or receiving. Such programs can also be set up to automatically scan software at the point of installation. Moreover, such programs have also included functionality to verify trusted Web sites and block fake Web sites.

SUMMARY

This specification describes technologies relating to security for software run in a computing system. A signature from a trusted entity that software, e.g., an application, is trusted can be used by users who trust the trusted entity to identify that the application can be trusted, permitting the user to install and run the application. The signature may also identify that a particular entity or person (e.g., an application developer) associated with the application is trusted, such as the application developer, which enables users to identify that any application associated with entity or person is trusted. Because trust is inferred by users based on the fact that the trusted entity trusts application, this can be referred to as a viral security system.

In general, one aspect of the subject matter described in this specification can be embodied in a method including receiving, at a computer, trust information corresponding to an application, the trust information comprising a digital signature from a trusted entity, determining if a user associated with the computer trusts the trusted entity, and using the digital signature to install the application on the computer if the user trusts the trusted entity.

The method can further include updating a local cache, retained by the computer, with the trust information received from the network-based information server system. The method can also or alternatively include querying the user to determine if the user associated with the computer trusts the trusted entity. The trust information can include a public key associated with the trusted entity, the application to be installed on the computer, and/or a certificate associated with a developer of the application to be installed on the computer.

The trust information can be used in the method to validate the identity of the trusted entity. Additionally, receiving trust information at a computer can include receiving at least some of the trust information at the computer from a network based information server system remote from the computer, receiving at least some of the trust information at the computer via e-mail, and/or downloading at least some of the trust information at the computer from a web site.

According to another aspect, the subject matter described in this specification can be embodied in a method including receiving, at a computer, trust information corresponding to an application developer, the trust information comprising a digital signature from a trusted entity, determining if a user associated with the computer trusts the trusted entity, and using the digital signature to install an application, created by the application developer, on the computer if the user trusts the trusted entity. Other features as described above may also be implemented with this aspect.

Other embodiments of this aspect include corresponding systems, apparatus, and computer program products.

Particular implementations of the subject matter described in this specification can realize one or more of the following advantages. Application developers can avoid using certificates provided by a centralized authority, which can be expensive. Instead, developers can use a public key and rely on trusted entities to disseminate to others that the developers' application is trustworthy. In some implementations a developer only has to post a key to their certificate on a website with their application; after the application is installed, for instance, by a trusted entity (e.g., a technically savvy person who trusts that application developer), anyone else that trusts the trusted entity will automatically trust the application as well. Additionally, trust may be based on the identity of the application developer, not just a particular application, because the application developer may use the same key for multiple applications. This permits a trusted entity to convey to users that the trusted entity trusts any application generated by the application developer. In this manner an application developer can virally build a reputation that allows the developer to make applications that can then be installed by a large social network of people.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A software application (which for brevity will simply be referred to as an application) is a computer program designed to add functionality to a general purpose computer. An application does not necessarily correspond to a file, may be stored in a portion of a file that holds other information, in a single file dedicated to the application in question, or in multiple coordinated files (which can be both local and remote). A software component of an application is a piece of software used with other software to build an application. A software component can include other components, does not necessarily correspond to a file, may be stored in a portion of a file that holds other information, in a single file dedicated to the software component in question, or in multiple coordinated files (which can be both local and remote).

Figure 1:
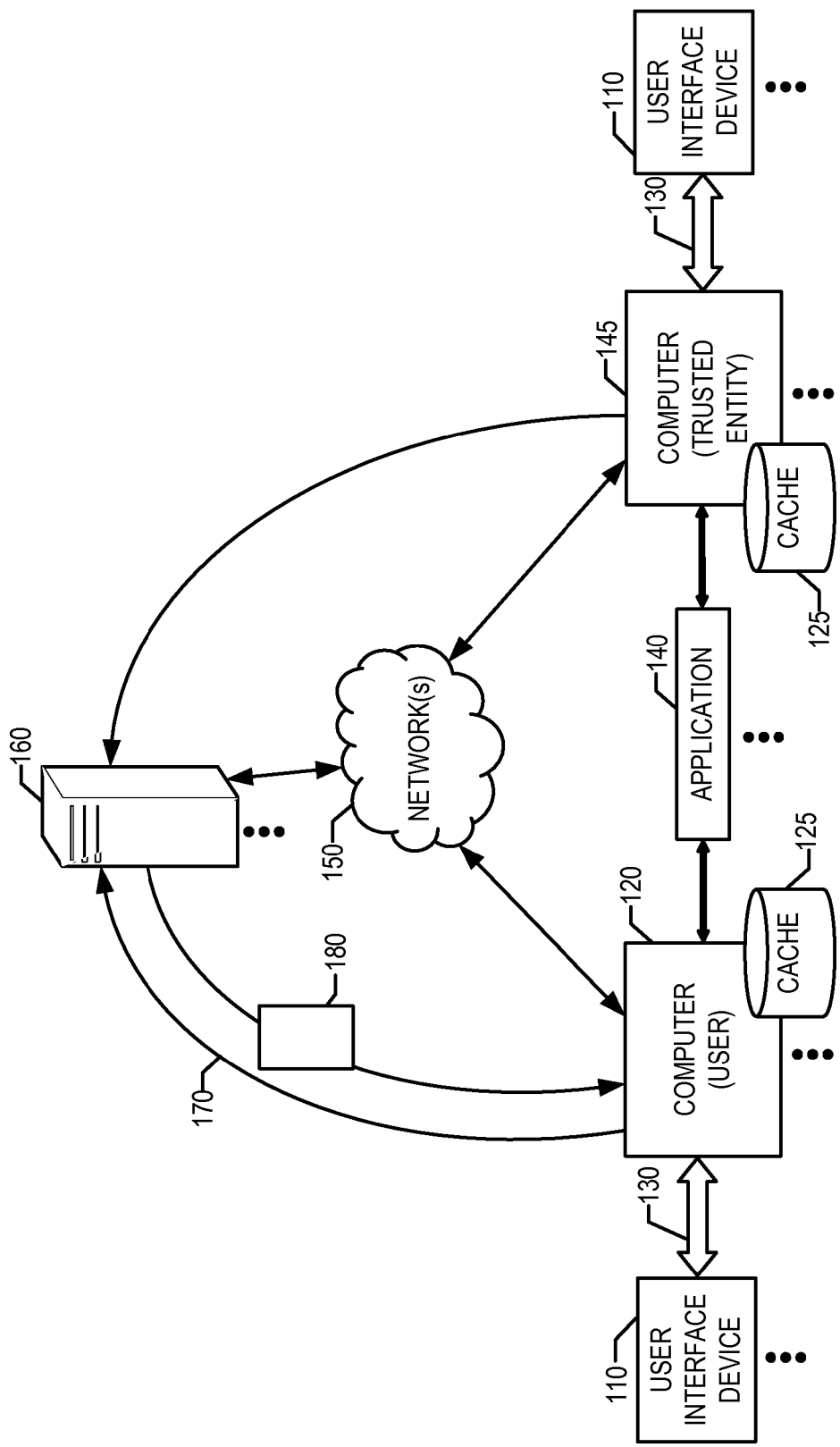
FIG. 1 shows an example system for identifying if an application for possible installation on a computer is to be trusted.

FIG. 1 shows an example system for identifying if an application to be installed and run on a computer should be trusted. In particular, the system permits a user to decide if an application is trusted, either automatically or based on authorization from the user, after a trusted entity identifies the application as trusted or as created by a trusted developer. This permits users that trust the trusted entity to install and execute the application without fear that the application includes harmful or malicious code.

As shown in FIG. 1, one or more user interface devices (110) are communicatively coupled with one or more computers (120, 145) through one or more channels (130). The channels (130) can include wired or wireless channels, one or more internal computing system busses, one or more computer networks, or combinations thereof. The user interface device(s) (110) can include input/output devices (e.g., a display, keyboard and mouse), and the computer(s) (120, 145) can be separate from the user interface device(s) (110) (e.g., server computers accessible over a network) or integrated with the user interface device(s) (110) (e.g., a laptop computer having a computer and a user interface device included therein).

A computer (120, 145) has an associated application (140) that can be installed, run, and updated. As described throughout this disclosure, a user may wish to install and run the application (140) only after a user deems that the application is trustworthy, i.e., is not likely to include malicious code that will harm the user's computer, compromise data on the user's computer, and the like. The application (140) can include components thereof, which are identified in order to manage whether the application (140) will be allowed to run on the computer (120, 145). A computer (120, 145) can include any one of many different types of computer platforms, which can run different operating systems. In addition, a computer (120, 145) can include a computing system that has additional applications installed, on which the application (140) depends.

The computer (120, 145) can create one or more certificates for the application (140). According to some implementations, the certificates may use public keys, and the individual applications and components can be digitally signed with certificates using known techniques. A certificate can be associated with a developer (where, as used herein, 'developer' can include a publisher, developer, distributor, or writer) of the application, can be specific to the application in question, or both. A digital certificate for the application can include multiple certificates, such as a chain of certificates created when the application was originally signed (e.g., by the application publisher). Additionally, according to some implementations, a certificate can be based in part on the name of an application or the name of the developer. For additional details regarding various techniques for creating a certificate, see U.S. patent application Ser. No. 12/001,497, entitled "Application Identification", filed Dec. 11, 2007.

As shown in FIG. 1, at least one computer (120) is associated with a user, and at least one computer (145) is associated with a trusted entity. The trusted entity can also be a user. For instance, the trusted entity can be a technically savvy user that non-technically savvy users believe may have a higher level of knowledge regarding whether an application can be trusted or not.

The computers (120, 145) can be connected to one or more information server systems (160) through a network (150). The network (150) can include one or more public networks (e.g., the Internet or the public switched telephone network), one or more private networks (e.g., an enterprise network or a virtual private network), or a combination of both. A network-based information server system (160) can be a single server computer or multiple server computers (e.g., a server cluster, a server farm, or distant server computers linked through a network). The information server system (160) can represent, for instance, a web server or server associated with the one or more computers (120,145). According to other implementations one or more of the computers (120, 145) do not require connections to the information server systems (160), for instance, where the computers (120, 145) fulfill one or more functions of the information server systems (160).

In operation, the computer (145) associated with the trusted entity identifies the application (140) or developer. If the trusted entity knows the developer of the application (140) or has other reason to trust that the application (140) will not cause harm to the computer (145) or compromise data of the computer (145), the trusted entity can assign trust to the developer or application to attest to other users that the application (140) is trustworthy.

Figure 3:
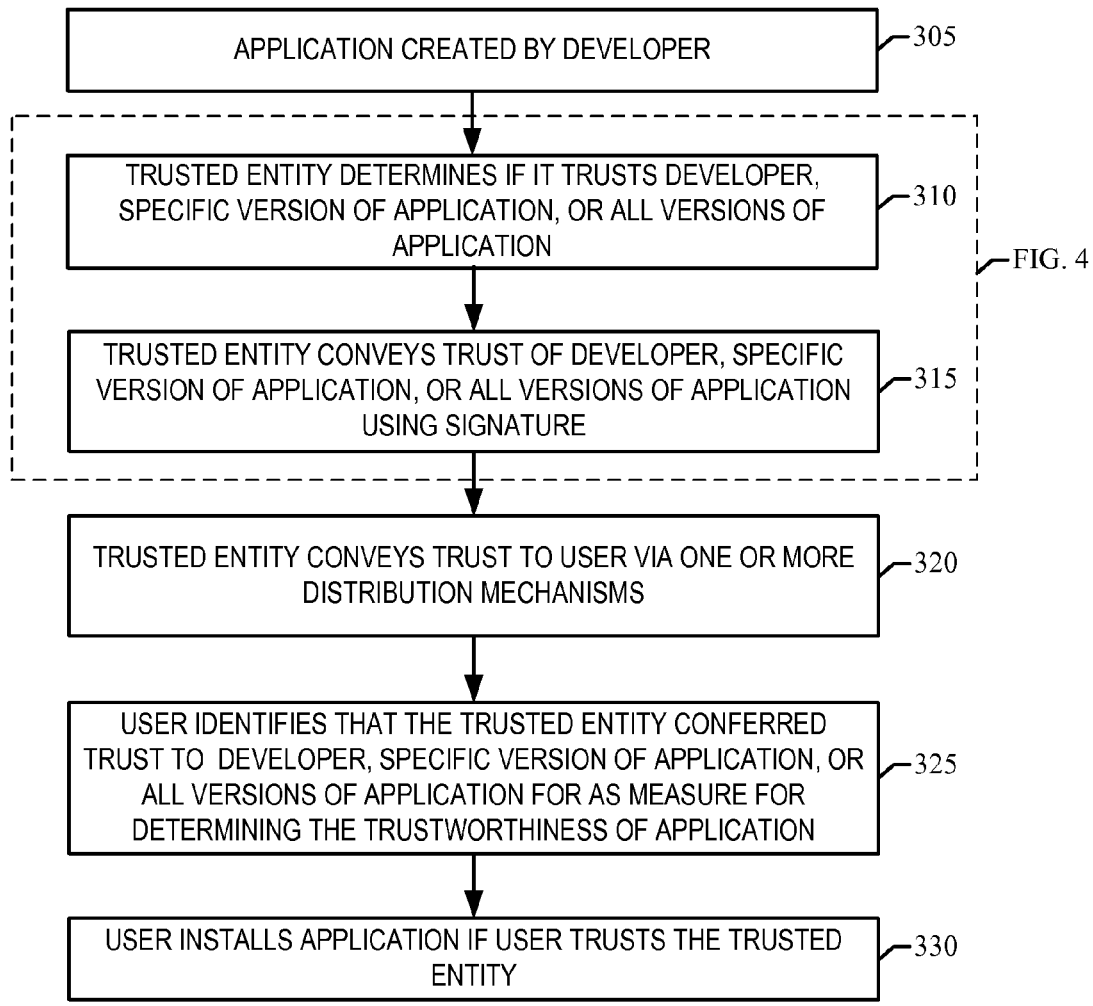
FIG. 3 shows an example process for identifying if an application to be installed and run on a computer should be trusted.
Figure 4:
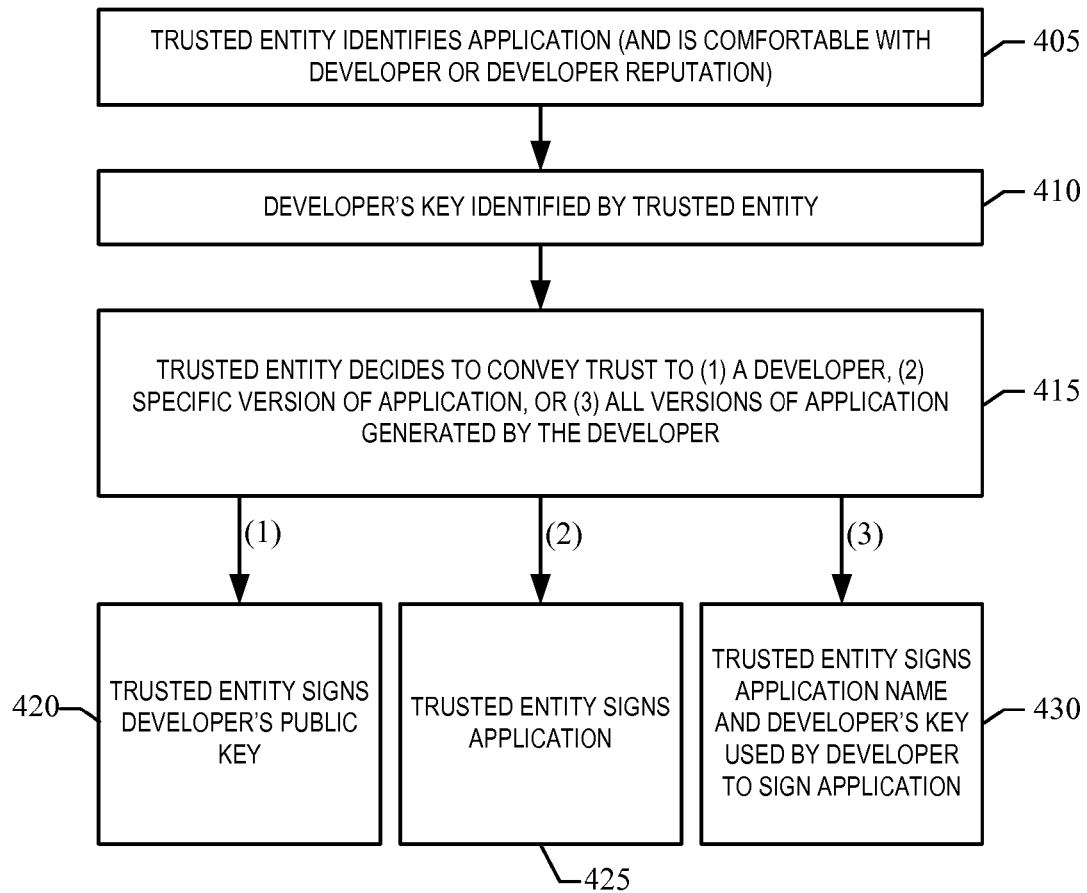
FIG. 4 shows an example process of a trusted entity in conveying trust to a developer or an application.

The trusted entity can use trust information including the developer's key and the trusted entity's public key to convey trust to the application, as is described in greater detail with respect to FIGS. 3 and 4. According to some implementations, the developer of the application (140) can provide the computer (145) of the trusted entity with an application certificate for the application (140), including a key (e.g., a public key). According to some implementations, the trusted entity can retrieve the key from the developer of the application (140) and/or from one or more other locations where the key is posted by the developer. For instance, the developer can post a public key to the application on the information server system (160), and more particularly, a developer's web page hosted by the system (160), for retrieval by the trusted entity. According to another example, the developer could email the key to the trusted party. This may also employ use of an e-mail server, for instance, hosted by the information server system (160).

One or more distribution mechanisms are employed to provide users with the trusted entity's conveyance of trust of the application. These distribution mechanisms publish and/or provide the trusted entity's public key and the trusted entity's signature to the computer (120) associated with a user. The application or developer's certificate is also transmitted to the computer (120) to facilitate downloading of the application by the computer (120). If a user trusts that the trusted entity can adequately attest that the application (140) is trustworthy, then trust information including the trusted entity's public key, the trusted entity's signature, and either the application or the developer's certificate are used by the computer (120) to validate the trusted entity's conveyance of trust and install the application (140).

According to some implementations, the trusted entity's public key can be transmitted to a user associated with a computer (120) via a secure communication channel or mechanism. This information is used to validate the signature made by the trusted entity. For instance, the trusted entity's public key can be emailed to a user. This can occur with the aid of the information server system (160). The user computer (120) can include a tool, for instance, that identifies the key and stores it in the computer (120) for use in installing and executing the application (140). The key may be stored in a location on the computer (120) that unauthorized entities (e.g., untrusted application or users) cannot write to. According to other implementations, the public key can be received by the user in person or by another secure mechanism. For instance, the public key can be retrieved by the user via logging into a secure web site from which the public key is made available to the user.

The signature and either the application or developer certificate can be acquired by the computer (120) separately or together via the one or more distribution mechanisms. In addition to receiving the signature and the application or developer certificate via e-mail, according to some implementations the signature and/or application or developer certificate can be published on a web site accessible by one or more users, where the computer (120) can access, download and store the trusted entity's signature and/or application or developer certificate in their runtime on their computers. The web site may be maintained by the developer or by a third party. For instance, the trusted entity's signature and/or application or developer certificate can be uploaded to the network-based information server system (160) shown in FIG. 1. Additionally, a web site administrator can be alerted that the trusted entity wishes to post a signature and/or application or developer certificate, and may have to authorize the posting of the signature and/or application or developer certificate to the web site.

According to some implementations, the signature and/or application or developer certificate can be e-mailed to one or more users. This can occur with the aid of the information server system (160). The computer (120) can include a tool, for instance, that identifies the signature and/or application or developer certificate and installs it on the computer (120). According to yet other implementations, the trusted party's signature can be transmitted back to the developer, which can add the signature to the certificate for the application such that users can view the signature during attempted installation of the signature.

As an illustrative example, the computer (120) can send a request (170) to the network-based information server system (160), and in response to the request (170) the network-based information server system (160) can transmit the trusted entity's signature and the application or developer certificate (180) to the computer (120). The request (170) for the trusted entity's signature and the application or developer certificate can be explicit, or the request (170) can be implicit, such as a request for a connection with the server system (160) for other services. Moreover, the request (170) can be sent periodically (e.g., based upon rules that can be pre-configured within the application or dynamically configured and adjusted within the application by a server system), sent upon designated events (e.g., whenever the computer (120) reconnects to the network (150) after being offline for awhile, or whenever the computer (120) installs or updates application (140) using a connection over the network (150)), or a combination of these. Further, the times when the request (170) is sent can be limited based on network bandwidth, computing system processing resources, and other factors for the overall system.

Because the computer (120) received the trusted entity's public key, for instance, in person, via a secure web site, or other secure mechanism (e.g., posted on a network and is signed by another trusted entity's private key and that entity's signature is known), once the trusted entity's signature and the application or developer certificate signature (180) is received these items may be stored in a local cache (125) retained by the computer (120) and/or used by a runtime in the computer (120) to verify the conveyance of trust (including the identity of the trusted entity) and to install the application (140). The local cache (125) can be implemented using hardware, firmware and application elements, and can employ encryption and anti-tampering techniques to maintain the security of the data therein.

In some implementations the user of a computer (120) can be prompted with a graphical user interface (GUI) indicating that the trusted party 'trusts' the application. The user may be prompted by the GUI to authorize or deny installation of the application on the computer (120). According to other implementations, the application may be installed automatically on the user computer (120) where the user computer includes the trusted entity's signature, the trusted entity's public key, and the application or developer certificate. The authorization may be transparent to the user. The user can also establish one or more default rules identifying applications deemed trusted by trusted entities that the user computer need not approve prior to installation and execution.

Figure 2:
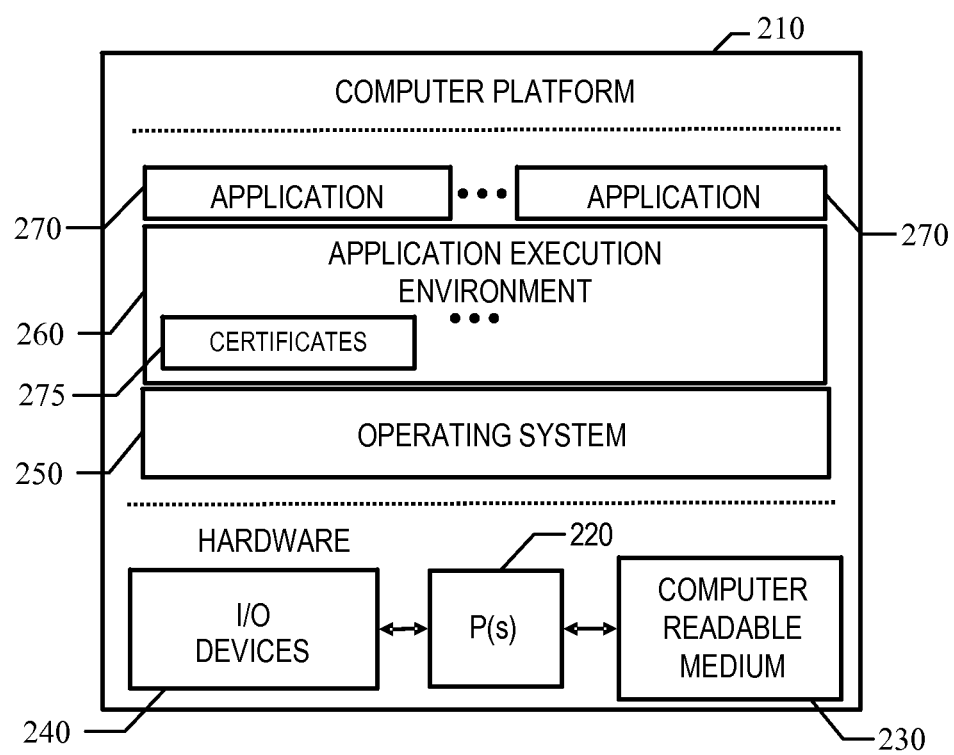
FIG. 2 shows an example computing system, including an application execution environment.

FIG. 2 shows an example computing system, including an application execution environment (260), in which applications are developed and/or executed. A computer platform (210) includes both hardware and application. The hardware includes input/output devices (240), one or more processors (220) and at least one computer readable medium (230) (e.g., memory device(s), a storage device(s), or combinations of one or more of them). The application can include an operating system (OS) (250) on which the application elements of the computer platform (210) operate. In addition, an application execution environment (260) can use the operating system (250) to interact with other elements of the computer platform (210).

The application execution environment (260) can provide various utility services for use by applications that run in the application execution environment (260). These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment (260) can include a cross-platform application program interface (API) that provides services to applications (270) that run in the application execution environment (260) and serves to abstract away details of the various hardware and OS platforms on which the application execution environment program (260) has been designed to operate.

The application execution environment (260) can be a cross-OS runtime environment, such as the Adobe® AIR™ runtime, provided by Adobe Systems Inc. of San Jose, Calif. In some implementations, the application execution environment (260) can load an application (270) from an encoded representation of the application (270). For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment (260) can decode the encoded representation of the application (270) into instructions and can execute the instructions of the application.

In addition, the application execution environment (260) can create one or more certificates (275) using one or more keys, such as public keys. According to some implementations a certificate can be application specific. According to some implementations, the same certificate can be used by a developer for every application the developer creates. Still other items may be created in the application execution environment (260), including digital signatures.

FIG. 3 shows an example process for identifying if application to be installed and run on a computer should be trusted by a user based on trust of the application or application developer by a trusted entity.

The process can begin when the application is created by a developer (305), for instance, using a computer (120). A key is associated with the developer (310). For instance, the key may be a public key. Next, a trusted entity, such as a user, determines if it trusts the developer, the specific application (i.e., the specific application version), or any versions of the application that have the same name that are signed by the developer's key (310). For instance, the computer (145) associated with the trusted entity may trust the application (140), or any application created from the developer if the trusted entity knows the developer of the application (140) or has other reason to trust that the application (140) will not cause harm to the computer (145) or compromise data of the computer (145).

If the trusted entity trusts the developer, the specific application (i.e., the specific version of the application), or any versions of the application that have the same name that are signed by the developer's key, the trusted entity conveys that trust by employing a digital signature. In particular, the trusted entity can use its own private key to sign one of three items: (1) the developer's public key used by the developer to sign the application, (2) the application itself, or (3) the application name and the developer's public key used by the developer to sign the application, as described in further detail below with respect to FIG. 4.

Next, the trusted entity conveys the trust to a user associated with a computer (120) via one or more distribution mechanisms (320). This can occur via a push mechanism (to the user) and/or a pull mechanism from a user computer (120). The information required by a computer (120) to receive an indication of trust from a trusted entity includes the trusted entity's public key, the digital signature made by the trusted entity, and either the application itself (which is signed by the developer's private key, which corresponds to the public key in the developer's certificate) or the developer's certificate.

To validate the trusted entity's signature the user computer (120) requires the trusted entity's public key. As described above, the trusted entity's public key can be transmitted to a computer (120) via a secure communication channel or mechanism, such as via encrypted e-mail, in person, or via another secure mechanism. The trusted entity's public key can alternatively be transmitted over an insecure mechanism, provided that the trusted entity's public key has been signed by another pre-existing trusted entity's private key and that signature is available with the corresponding public key of the pre-existing trusted entity. The computer (120) can include a tool, for instance, that identifies the key and stores it in the computer (120) for use in validate the trusted entity's signature to permit installation of the application (140). Preferably the key is stored in a location on the computer (120), such as the cache (125), that unauthorized entities (e.g., untrusted application or users) cannot write to.

The trusted entity's signature and either the application or developer certificate is also acquired by the computer (120) either separately or together via the one or more distribution mechanisms. In addition to receiving the signature and the application or developer certificate via e-mail (for instance, by the information server system (160)), according to some implementations the signature and/or application or developer certificate can be published on a web site accessible by one or more users, where the computer (120) can access, download and store the trusted entity's signature and/or application or developer certificate in their runtime on their computers.

Referring again to FIG. 3, the user associated with the computer (120) can identify that the trusted entity conferred trust to either the developer, application (i.e., specific version), or all versions of application as a measure of the trustworthiness of application (325). Although the user does not know any information about the application or developer, the user may rely on the fact that trusted entity 145 conferred trust on the application or developer. If the user trusts the trusted entity, the user can install the application (330). For instance, this can occur using the signature, created by the trusted entity, that signs some aspect of the application, including either (1) the developer's public key (e.g., provided by the application developer), (2) the application, or (3) the application name and the developer's public key used to validate the signature. In the case of (1) or (3), the developer's public key is also required by the computer (120) to validate the signature. The information can be stored, for instance, by the computer (120) in the local cache.

This permits a user to decide if application is trusted, either automatically or based on authorization from the user, after a trusted entity identifies the application as trusted or as created by a trusted developer. This permits users that trust the trusted entity to install and execute the application without fear that the application includes harmful or malicious code.

According to some implementations, the user of a computer (120) can be prompted with a graphical user interface (GUI) asking whether the user trusts the application based on the recommendation of trust provided by the trusted party via the trusted party's signature. The user may be prompted by the GUI to authorize or deny installation of the application on the computer (120). According to other implementations, the application maybe installed automatically on the user computer (120) where the user computer includes the trusted party's signature.

FIG. 4 shows an example process of a trusted entity in conveying trust to a developer or application. The example process can represent blocks (310) and (315) shown in FIG. 3. According to some implementations, a trusted entity can attest to the trustworthiness of application (i.e., a single version of application), all application generated by a developer, or all versions of application sharing the same name and digitally signed by a trusted developer.

The trusted entity identifies an application for which it wishes to confer trust to other users because the trusted entity is comfortable with the developer or developer's reputation (405). The trusted entity then identifies the developer's key (410), which may be, for instance, a public key transmitted directly to the trusted entity or downloaded by the trusted entity. As described above, the key may be made available for downloading by the trusted entity from a web site of the developer.

To convey trust the trusted entity determines if it will convey trust to: (1) a developer, (2) a specific application (i.e., a specific version of an application), or (3) all versions of the application having the same title that are generated by the developer (415). Depending on the trust the trusted entity wishes to convey, the trusted entity then generates a signature using one of three methods.

The trusted entity can sign the developer's public key that was used by the developer to sign the application (420). By doing this, the trusted entity is assigning trust to all applications signed by the private key that corresponds to the developer's public key. This can include, for instance, an application that does not exist yet. The trusted entity does not need to have possession or access to application from the developer to do this.

The trusted entity can sign the application (425). By doing this, the trusted entity is assigning trust to the particular version of the application acquired by the trusted entity. The trusted entity can check the developer's signature of the application to verify that the application has not been modified since the application was received by the trusted entity from the developer.

The trusted entity can also sign the application name and the developers public key that was used by the developer to sign the application (430). By doing this, the trusted entity is assigning trust to all application with that same name that are signed by the developer's public key. This allows the developer to have multiple versions of application that are all trusted by the trusted entity. The function of two different versions of the application may vary greatly even though they share the same name and are signed by the same certificate.

As described with respect to FIGS. 1-3, the signature of the trusted entity can be received by a user's computer (120) and verified using the public key of the trusted entity. If the user trusts the trusted entity, the user can download and install: (1) any application developed by the developer, where the trusted entity conveyed trust to a developer; (2) the specific application for which trust was conveyed by the trusted entity; or (3) any application generated by the developer with the developer's key that has the same name as an application for which the trusted entity conveyed trust.

Once received, the trusted entity's signature, along with the trusted entity's public key, and the application or developer certificate signature (180), which may be received by the computer (120) using one or more distribution mechanisms, may be stored in a local cache (125) retained by the computer (120) and/or used by a runtime in the computer (120) to verify the conveyance of trust (including the identity of the trusted entity) and to install the application (140).

Embodiments of the subject matter and the functional operations described in this specification can be implemented in digital electronic circuitry, or in computer application, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single application product or packaged into multiple application products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving, at a computer, a request to install an application associated with a developer of the application, the request to install being received from a potential user of the application;
   in response to the request to install, requesting, by the computer, trust information corresponding to the application and indicating whether a trusted entity trusts the application, the trusted entity being another user who trusts the application, is trusted by the potential user and is different than the developer;
   receiving the trust information at the computer, wherein the received trust information corresponding to the application and indicating whether the trusted entity trusts the application comprises a public key of the trusted entity and a digital signature relating to the application and generated by the trusted entity;
   validating, by the computer, the digital signature relating to the application using the public key of the trusted entity, wherein the validating results in an indication that the trusted entity trusts the application; and
   installing the application on the computer based on the indication that the trusted entity trusts the application.

2. The method of claim 1, further comprising:
   updating a local cache, retained by the computer, with the trust information.

3. The method of claim 1, further comprising:
   querying the potential user to obtain user confirmation that the potential user trusts the trusted entity.

4. The method of claim 1, wherein the digital signature relating to the application from the trust information corresponding to the application and indicating whether the trusted entity trusts the application is generated by the trusted entity by signing with a private key of the trusted entity the application to be installed on the computer.

5. The method of claim 1, wherein the trust information corresponding to the application and indicating whether the trusted entity trusts the application further comprises:
   a certificate associated with a developer and signed by a private key of the developer.

6. The method of claim 1, wherein receiving the trust information comprises:
   receiving at least some of the trust information at the computer from a network based information server system remote from the computer.

7. The method of claim 1, wherein receiving trust information at a computer comprises:
   receiving at least some of the trust information at the computer via e-mail.

8. The method of claim 1, wherein receiving trust information at a computer comprises:
   downloading at least some of the trust information at the computer from a web site.

9. A computer-implemented method, comprising:
  receiving, at a computer, a request to install an application associated with a developer of the application, the request to install being received from a potential user of the application;
  in response to the request to install, requesting, by the computer, trust information corresponding to the developer and indicating whether a trusted entity trusts the developer, the trusted entity being another user who trusts the developer, is trusted by the potential user and is different than the developer;
  receiving the trust information at the computer, wherein the received trust information corresponding to the developer and indicating whether the trusted entity trusts the developer comprises a public key of the trusted entity and a digital signature relating to the developer and generated by the trusted entity;
  validating, by the computer, the digital signature relating to the developer using the public key of the trusted entity, wherein the validating results in an indication that the trusted entity trusts the developer;
  querying the potential user by the computer to obtain user confirmation that the potential user trusts the trusted entity; and
  installing the application on the computer based on the indication that the trusted entity trusts the developer and the user confirmation that the potential user trusts the trusted entity.

10. The method of claim 9, further comprising:
  updating a local cache, retained by the computer, with the trust information.

11. The method of claim 9, wherein the digital signature relating to the developer from the trust information corresponding to the developer and indicating whether the trusted entity trusts the developer is generated by the trusted entity by signing a public key of the developer using a private key of the trusted entity.

12. The method of claim 9, wherein the trust information corresponding to the developer and indicating whether the trusted entity trusts the developer further comprises:
  a certificate associated with the developer and signed by a private key of the developer.

13. The method of claim 9, wherein receiving trust information comprises:
  receiving at least some of the trust information from a network based information server system remote from the computer.

14. The method of claim 9, wherein receiving trust information comprises:
  receiving at least some of the trust information via e-mail.

15. The method of claim 9, wherein receiving trust information comprises:
  downloading at least some of the trust information from a web site.

16. A computer-implemented method comprising:
  storing, at a network-based information server system, trust information corresponding to an application associated with a developer of the application, the trust information received from a trusted entity and indicating whether the trusted entity trusts any version of the application associated with the developer, where the trusted entity is a user of the application who trusts both the application and the developer and who is different than the developer, wherein the stored trust information indicating whether the trusted entity trusts any version of the application associated with the developer comprises a public key of the trusted entity and a digital signature generated by the trusted entity and relating to the application and the developer;
  receiving, at the network-based information server system from a computer associated with another user who trusts the trusted entity, a request specifying a name of the application associated with the developer;
  identifying, based on the request, the stored trust information indicating whether the trusted entity trusts any version of the application associated with the developer; and
  transmitting the identified trust information to the computer associated with the other user who trusts the trusted entity for use in installing any version of the application associated with the developer and having the specified name.

17. The method of claim 16, wherein the digital signature relating to the application and the developer from the trust information indicating whether the trusted entity trusts any version of the application associated with the developer is generated by the trusted entity by signing both a public key of the developer and the name of the application associated with the developer with a private key of the trusted entity.

18. The method of claim 16, wherein the trust information indicating whether the trusted entity trusts any version of the application associated with the developer further comprises:
  a certificate associated with the developer of the application and signed by a private key of the developer.

19. The method of claim 16, wherein transmitting the stored trust information comprises transmitting the stored trust information via e-mail.

20. The method of claim 16, where the network-based information server system comprises a web server.

21. The method of claim 16, wherein receiving, at the network-based information server system, a request comprises receiving a request at a web site.

22. A system comprising:
  a user interface configured to receive input from a user associated with the system;
  a cache device;
  one or more processors communicatively coupled with the cache device; and
  a non-transitory storage medium storing instructions that, when executed by the one or more processors, cause the system to perform operations comprising:
    identifying an application associated with a developer of the application;
    receiving, from a network-based information server system, trust information corresponding to the developer and indicating whether a trusted entity trusts the developer, the trusted entity being another user of the application who trusts the application, is trusted by the user associated with the system and is different from the developer, wherein the received trust information corresponding to the developer and indicating whether the trusted entity trusts the developer comprises a public key of the trusted entity and digital signature relating to the developer and generated by the trusted entity;
    updating the cache device with the trust information received from the network-based information server system;
    determining that the trusted entity trusts the developer, at least in part, by validating the digital signature relating to the developer using the public key of the trusted entity; and installing either the application or any other application developed by the developer based on the determining that the trusted entity trusts the developer.

23. The system of claim 22, wherein the operations further comprise querying a user associated with the system to obtain confirmation that the user trusts the trusted entity.

24. The system of claim 22, wherein the digital signature relating to the developer from the trust information corresponding to the developer and indicating whether the trusted entity trusts the developer is generated by the trusted entity by signing a public key of the developer using a private key of the trusted entity.

25. The system of claim 22, wherein the trust information corresponding to the developer and indicating whether the trusted entity trusts the developer further comprises a certificate associated with the application developer.

26. The system of claim 22, wherein receiving trust information comprises:
   receiving at least some of the trust information via e-mail.

27. The system of claim 22, wherein receiving trust information comprises:
   downloading at least some of the trust information from a web site.

28. A non-transitory computer-readable storage medium encoding a computer program product operable to cause data processing apparatus to perform operations comprising:
   identifying, at a computer associated with a user, an application associated with a developer of the application;
   receiving trust information at the computer, the trust information corresponding to the application and indicating whether a trusted entity trusts the application, the trusted entity being another user who trusts the application, is trusted by the user and is different than the developer, wherein the received trust information corresponding to the application and indicating whether the trusted entity trusts the application comprises a public key of the trusted entity and a digital signature relating to the application and generated by the trusted entity;
   determining that the trusted entity trusts the application at least in part by validating the digital signature relating to the application using the public key associated with the trusted entity; and
   installing the application based on the determining that the trusted entity trusts the application.

29. The non-transitory computer-readable storage medium of claim 28, further operable to cause data processing apparatus to perform operations comprising:
   updating a local cache, retained by the computer, with the trust information received from a network-based information server system.

30. The non-transitory computer-readable storage medium of claim 28, further operable to cause data processing apparatus to perform operations comprising:
   querying the user to obtain user confirmation that the user trusts the trusted entity.

31. The non-transitory computer-readable storage medium of claim 28, wherein the digital signature relating to the application from the trust information corresponding to the application and indicating whether the trusted entity trusts the application is generated by the trusted entity by signing with a private key of the trusted entity the application to be installed on the computer.

32. The non-transitory computer-readable storage medium of claim 28, wherein the trust information corresponding to the application and indicating whether the trusted entity trusts the application further comprises:
   a certificate associated with the developer of the application to be installed on the computer.

33. The non-transitory computer-readable storage medium of claim 28, wherein receiving trust information at a computer comprises:
   receiving at least some of the trust information at the computer from a network based information server system remote from the computer.

34. The non-transitory computer-readable storage medium of claim 28, wherein receiving trust information at a computer comprises:
   receiving at least some of the trust information via e-mail.

35. The non-transitory computer-readable storage medium of claim 28, wherein receiving trust information at a computer comprises:
   downloading at least some of the trust information from a web site.

* * * * *